(12) United States Patent
Rotella et al.

(10) Patent No.: US 6,313,959 B1
(45) Date of Patent: Nov. 6, 2001

(54) METHOD AND APPARATUS FOR MOUNTING AN OPTICAL ELEMENT

(75) Inventors: Vincent F. Rotella, Avenel; John W. Keat, Rahway, both of NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/239,861

(22) Filed: Jan. 29, 1999

(51) Int. Cl.[7] .............................. G02B 7/02; G02B 6/26; G02B 6/00

(52) U.S. Cl. .......................... 359/819; 359/811; 385/15; 385/51; 385/136

(58) Field of Search ................................ 359/819, 811; 385/15, 51, 52, 53, 136, 137

(56) References Cited

U.S. PATENT DOCUMENTS

| | | | |
|---|---|---|---|
| 4,732,451 | * | 3/1988 | Furuta et al. .......................... 385/43 |
| 4,824,197 | * | 4/1989 | Patterson ............................. 385/137 |
| 5,880,894 | * | 3/1999 | Blakley ............................... 359/819 |

\* cited by examiner

*Primary Examiner*—Scott J. Sugarman
*Assistant Examiner*—Saeed Seyrafi (57) ABSTRACT

An apparatus and method for mounting an optical element onto a mounting plate is disclosed. In one embodiment, a mounting support structure defines a plurality of apertures therein. The mounting support structure is positioned between the optical element and the mounting plate with the apertures of the mounting support structure aligning with apertures defined by the optical element and the mounting plate. Connection hardware inserted through the aligned apertures secures the optical element, the mounting support structure, and the mounting plate together.

24 Claims, 7 Drawing Sheets

METHOD AND APPARATUS FOR MOUNTING AN OPTICAL ELEMENT

BACKGROUND OF THE INVENTION

The present invention relates to an apparatus and method for mounting an optical element. More specifically, the invention provides a support structure for utilization when mounting the optical element on a mounting plate.

Currently, it is possible to mount standardized, commercially available optical elements to a mounting plate. These optical elements may be, for example, wave length division multiplexers (WDM) or couplers that are mounted to the mounting plate and then installed in a larger optical unit, such as a repeater. When utilizing these standardized, commercially available optical elements, the mounting plate and the optical element may not optimally mate. If the optical element and the mounting plate do not mate properly, it is possible that the optical element could be deleteriously impacted. For example, the optical element could loosen from the mounting plate and thus possibly become damaged as a result.

Figure 1:
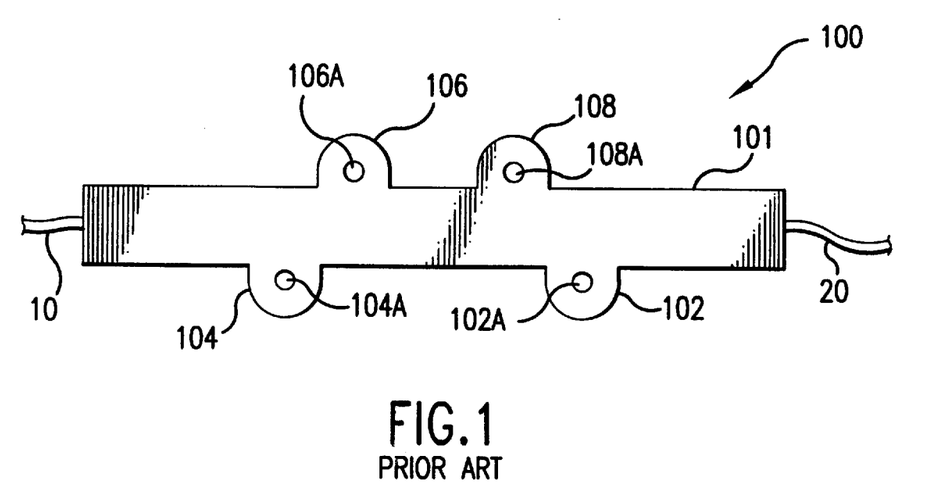
FIG. 1 is a top view of an optical element that may be mounted by practicing the present invention.
Figure 2:
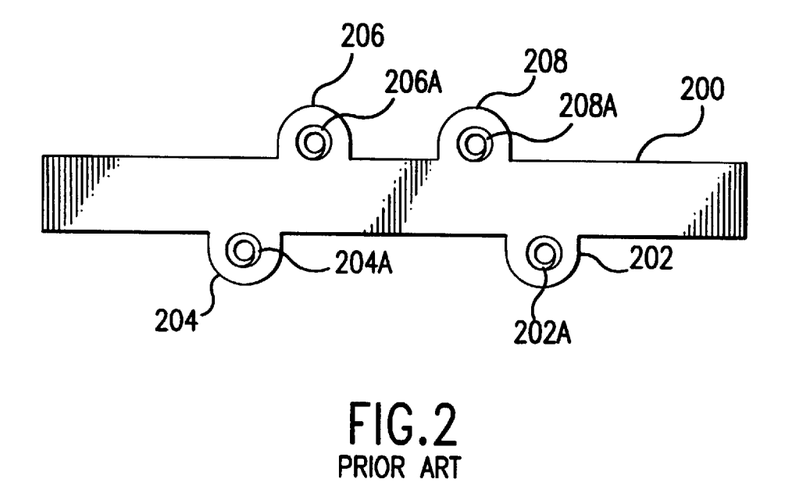
FIG. 2 is a top view of a mounting plate that may be utilized when practicing the present invention.

FIG. 1 illustrates a known optical element 100 that is to be mounted to a mounting plate 200, which is illustrated in FIG. 2. Optical element 100 could be any of a variety of elements, one of which may be the wave length division multiplexer mentioned above available, for example from Corning. Optical element 100 includes an input fiber 10 and an output fiber 20 for carrying optical signals through optical element 100. Optical element 100 includes a casing 101, within which is contained the optical component, e.g., the WDM mentioned above. Casing 101 has four mounting tabs, namely tabs 102, 104, 106, and 108, which define apertures 102A, 104A, 106A, and 108A, respectively. The mounting tabs receive connection hardware therethrough to mount optical element 100 to mounting plate 200.

FIG. 2 illustrates a known mounting plate 200. Mounting plate 200 also includes four mounting tabs 202, 204, 206, and 208. The mounting tabs on mounting plate 200 align with the mounting tabs on optical element 100 when optical element 100 is positioned onto mounting plate 200 for mounting of the optical element to the mounting plate. Mounting tabs 202, 204, 206, and 208 each include a threaded insert 202A, 204A, 206A, and 208A, respectively, within them. The threaded inserts are positioned within the apertures defined by the mounting tabs and may be retained within the mounting tabs by utilizing an adhesive.

Figure 3:
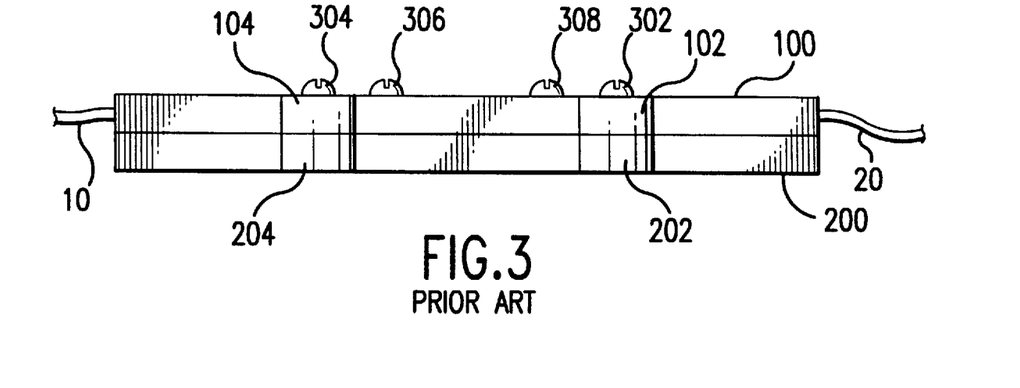
FIG. 3 is a side view of a prior art arrangement for mounting the optical element of FIG. 1 to the mounting plate of FIG. 2.
Figure 4:
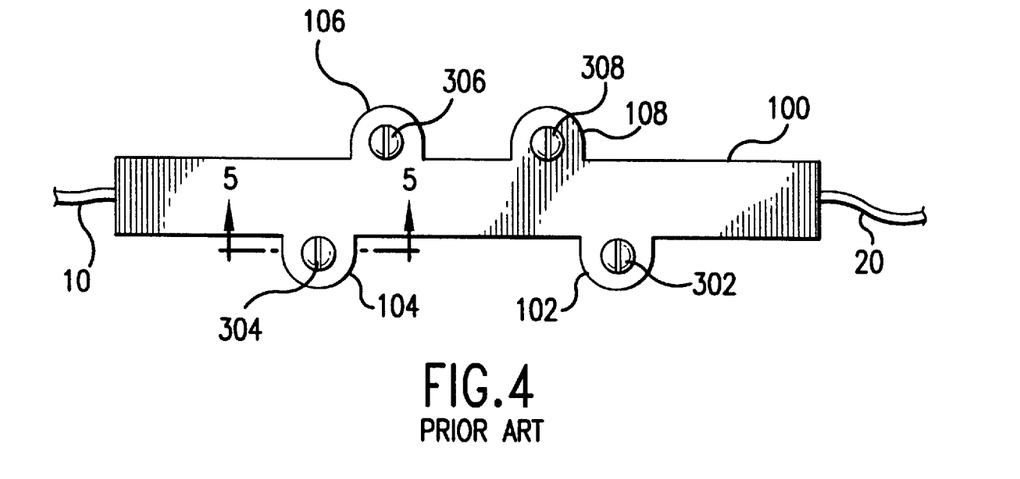
FIG. 4 is a top view of the prior art mounting arrangement of FIG. 3.

FIGS. 3 and 4 illustrate a prior art arrangement for mounting optical element 100 to mounting plate 200. As can be seen, optical element 100 is positioned and aligned on mounting plate 200 such that mounting tabs 102, 104, 106, and 108 of optical element 100 align with mounting tabs 202, 204, 206, and 208 of mounting plate 200, respectively. Mounting hardware, e.g., a screw, is received within the aligned mounting tabs to secure optical element 100 to mounting plate 200. As such, screw 302 is received within tabs 102 and 202, screw 304 is received within tabs 104 and 204, screw 306 within tabs 106 and 206, and screw 308 within tabs 108 and 208. A threaded end of each screw threadedly engages with the threaded insert included in each mounting tab in mounting plate 200 to secure optical element 100 to mounting plate 200.

Figure 5:
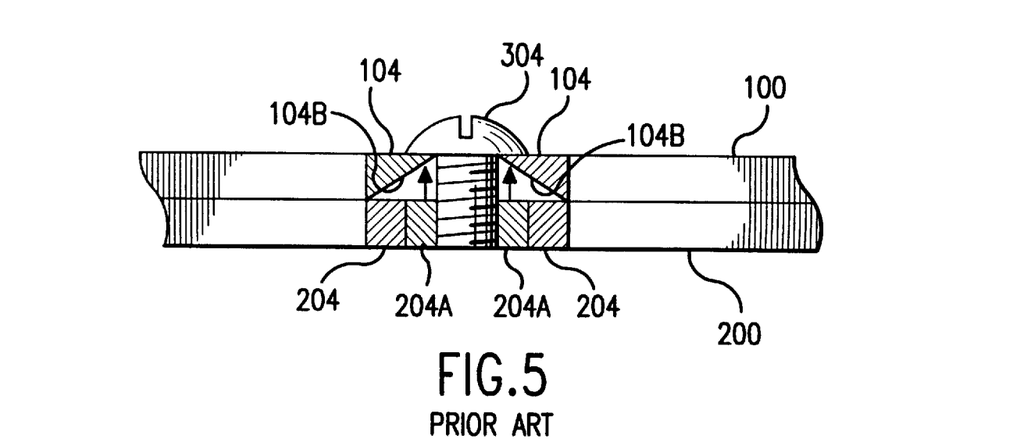
FIG. 5 is a cross-sectional view of the prior art mounting arrangement of FIGS. 3 and 4 as taken along line 5—5 of FIG. 4.

However, at least one drawback exists with the currently known method for mounting optical element 100 to mounting plate 200. Whereas FIG. 5 illustrates the arrangement of one mounting tab of optical element 100 and one mounting tab of mounting plate 200, all of the mounting tabs of optical element 100 and mounting plate 200 are similarly configured, as described above, and thus the same drawback discussed below is associated with each set of mounting tabs. As can be seen in FIG. 5, mounting tab 104 of optical element 100 includes an inner taper 104B. As screw 304 is threaded into threaded insert 204A of mounting tab 204 on mounting plate 200, threaded insert 204A is susceptible to being pulled out of mounting tab 204 in reaction to the downward threading of screw 304 into threaded insert 204A. If threaded insert 204A is pulled out of tab 204, threaded insert 204A would tend to move upward in the direction of the arrows shown in FIG. 5. This upward movement of threaded insert 204A could result in the threaded insert applying pressure upward against the tapered walls 104B of tab 104 of optical element 100. This upward force could result in cracking and splitting of the mounting tabs and casing of the optical element, thus rendering the optical element useless since it can no longer be secured to the mounting plate.

One reason that the mounting tabs of the casing of the optical element may be formed with the tapered inner surface is to assist in the manufacturing of the casing. When these casings are formed in a mold, the tapered surface in the mounting tab allows the finished molded part to be more easily removed from the mold. The tapered surface within the tab provides for less friction and adhesion between the mold structure and the finished molded part when the finished part is removed from the mold. If the mounting tab aperture was formed as a cylindrical bore by providing a cylindrical pin-type structure in the mold this could result in problems when removing the finished part from the mold due to the increased frictional forces between the casing and the mold which would result when removing the casing from the mold.

Therefore, the casings are likely to be continued to be manufactured with inner tapered surfaces in the mounting tabs and it would be desirable to provide an improved apparatus and method for mounting the optical element onto a mounting plate.

SUMMARY OF THE INVENTION

In accordance with the present invention, an apparatus and method for mounting an optical element onto a mounting plate is provided. In one embodiment of the present invention, a mounting support structure is provided that defines a plurality of apertures therein. The mounting support structure is positioned between the optical element and the mounting plate with the apertures of the mounting support structure aligning with apertures defined by the optical element and the mounting plate. Connection hardware is inserted through the aligned apertures to secure the optical element, the mounting support structure, and the mounting plate together.

BRIEF DESCRIPTION OF THE DRAWINGS

The various features of the invention will best be appreciated by simultaneous reference to the description which follows and the accompanying drawings, in which.

DETAILED DESCRIPTION

Figure 6:
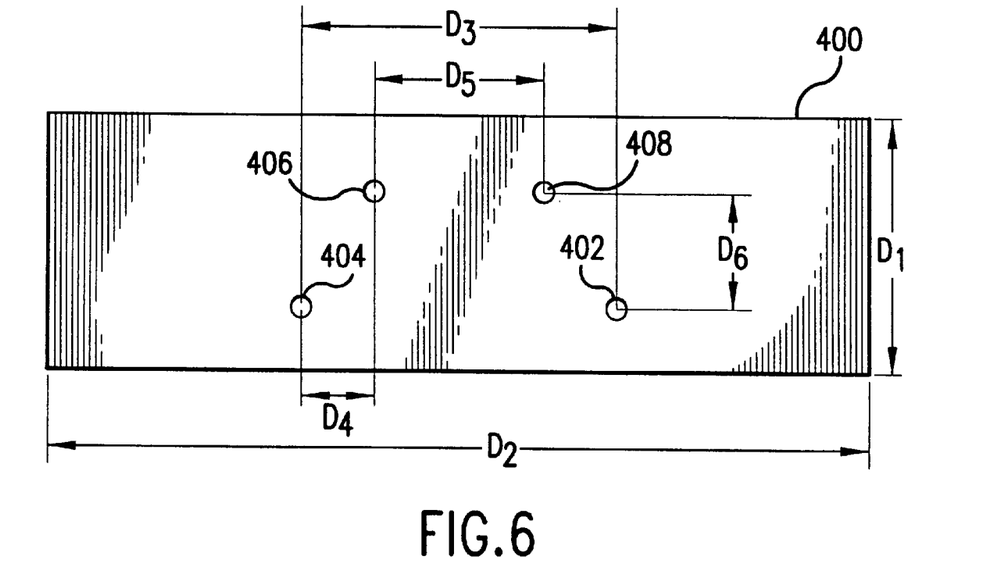
FIG. 6 is a top view of a first embodiment of a mounting support structure in accordance with the present invention.
Figure 7:
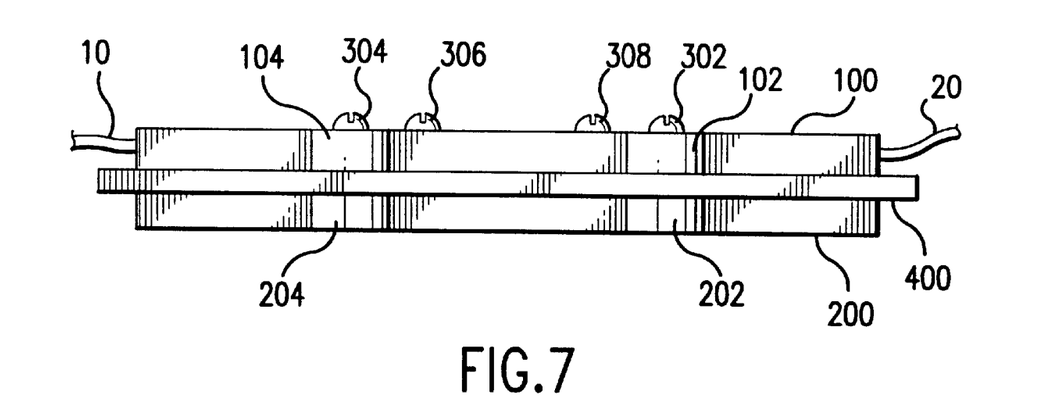
FIG. 7 is a side view of a mounting arrangement for an optical element and mounting plate utilizing the first embodiment of the mounting support structure of FIG. 6.

FIG. 6 illustrates a first embodiment for a mounting support structure in accordance with the principles of the present invention. As can be seen, and as will be further described, mounting support structure, or shim, 400 comprises a rectangular, flat plate. Mounting support structure 400 defines four support structure apertures 402, 404, 406, and 408 within it. These four apertures in mounting support structure 400 are positioned relative to each other such that they will align with the apertures that are defined by optical element 100 and mounting plate 200, as shown in FIGS. 1 and 2. As such, securement hardware, such as screws, can be inserted within the aligned apertures of optical element 100, mounting support structure 400, and mounting plate 200 in order to secure optical element 100 to mounting plate 200. As can be seen in FIG. 7 and as will be described more fully later in this specification, mounting support structure 400 is positioned between optical element 100 and mounting plate 200 when securing optical element 100 to mounting plate 200. The apertures are sized and positioned in mounting support structure 400 such that, under all conditions of tolerance defined for the particular mounting application, the threaded inserts in mounting plate 200 are shouldered by the mounting support structure 400 and thus prevented from traveling upward and causing damage to optical element 100. A methodology for sizing and positioning the apertures in mounting support structure 400 which may be used when practicing the present invention is the composite positioning methodology, which is described in the American Society of Mechanical Engineering (ASME) publication "Dimensioning and Tolerancing", ASME Y14.5M-1994, which is incorporated herein by reference.

Mounting support structure 400 will now be described in greater detail. As can be seen in FIG. 6, mounting support structure 400 is rectangular in shape. Mounting support structure 400 defines within it four support structure apertures 402, 404, 406, and 408, as described above, which extend completely through the thickness of mounting support structure 400. As was also mentioned previously, the four support structure apertures in mounting support structure 400 are positioned relative to each other on mounting support structure 400 such that they correlate in their relative positioning to the apertures that are defined by optical element 100 and mounting plate 200. Thus, when mounting support structure 400 is positioned between optical element 100 and mounting plate 200, support structure aperture 402 aligns with the apertures defined in mounting tabs 102 and 202, aperture 404 aligns with the apertures defined in mounting tabs 104 and 204, aperture 406 aligns with the apertures defined by mounting tabs 106 and 206, and aperture 408 aligns with the apertures defined in mounting tabs 108 and 208.

Representative dimensions for the physical size of mounting support structure 400 include a width $D_1$ of 0.805 inches±0.01 inches and a length $D_2$ of 3.5 inches±0.02 inches. Mounting support structure 400 has a thickness of approximately 0.02 inches. With respect to the positioning of the four apertures in mounting support structure 400, it can be seen in FIG. 6 that apertures 402 and 404 are positioned on one longitudinal axis of mounting support structure 400 and apertures 406 and 408 are positioned on a second longitudinal axis of mounting support structure 400. The longitudinal axis that includes apertures 402 and 404 on it is separated by a distance $D_6$ of approximately 0.550 inches from the longitudinal axis that contains apertures 406 and 408 on it. Aperture 402 is separated a distance $D_3$ of 1.118 inches from aperture 404 on its common longitudinal axis. Aperture 408 is separated by a distance $D_5$ of 0.584 inches from aperture 406 on its common longitudinal axis. Aperture 406 is off-set a distance $D_4$ of 0.267 inches from aperture 404 as measured from an axis extending through aperture 404 and perpendicular to the longitudinal axis on which lie apertures 402 and 404. Aperture 408 is off-set a similar distance from aperture 402. The distances provided above for the relative positioning of the apertures in mounting support structure 400 are all approximate and the present invention is not limited to the specific dimensions provided. Regardless of the specific relative positioning for the apertures in the mounting support structure, the apertures align with the apertures included in the optical element and the mounting plate.

Whereas mounting support structure 400 can be used in a variety of different applications in conjunction with a variety of different optical elements and mounting plates, the embodiment of FIG. 6 can be used particularly in an application where optical element 100 is a wave division multiplexer (WDM) and the WDM is a component in an amplifier pair that is installed in an optical repeater, such as is available from Tyco Submarine Systems, Ltd. Mounting support structure 400 is sized and shaped to be accommodated within the amplifier pair assembly in the optical repeater.

Figure 8:
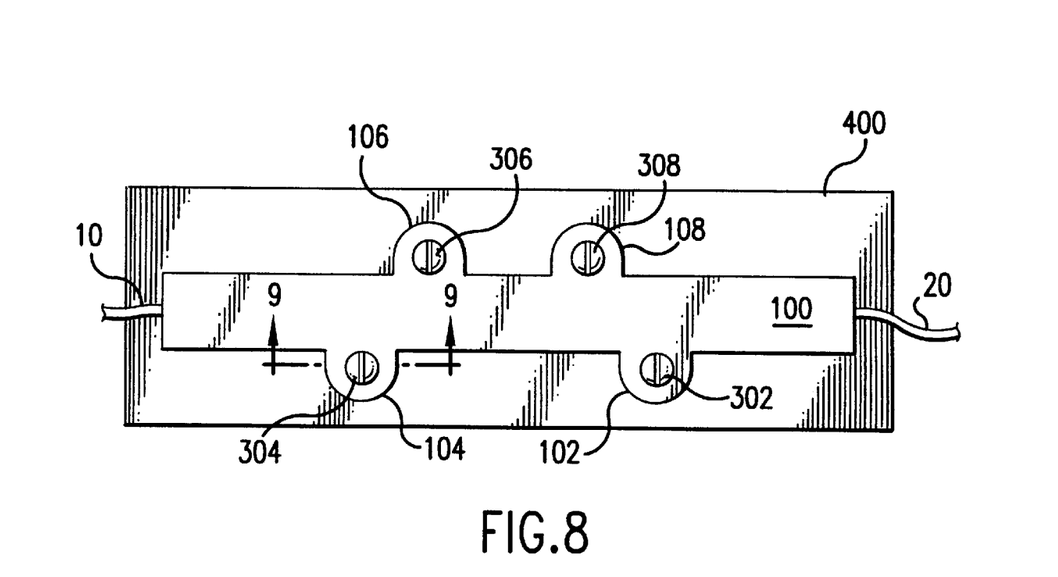
FIG. 8 is a top view of the mounting arrangement of FIG. 7.

As can be seen in FIGS. 7 and 8, and as was described above, mounting support structure 400 is positioned between optical element 100 and mounting plate 200 when optical element 100 is to be mounted onto mounting plate 200. As such, all of the apertures that are included in optical element 100, mounting support structure 400, and mounting plate 200 align so that mounting hardware can be inserted through the aligned apertures in order to mount optical element 100 to mounting plate 200. Thus, mounting hardware 302, 304, 306, and 308 is utilized to mount optical element 100 to mounting plate 200.

Figure 9:
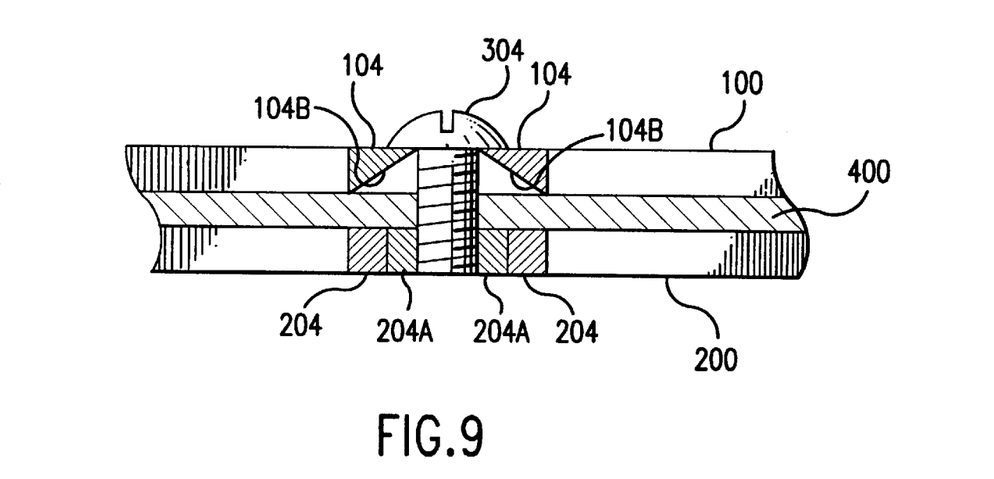
FIG. 9 is a cross-sectional view of the mounting arrangement of FIGS. 7 and 8 as taken along line 9—9 of FIG. 8.

As can be seen in FIG. 9, and as will be described, the positioning of mounting support structure 400 between optical element 100 and mounting plate 200 will prevent the threaded inserts that are included in the apertures of the mounting tabs of mounting plate 200 from pulling up and out of the mounting tabs and engaging the tapered surfaces of the mounting tabs of optical element 100, which could possibly result in the cracking of the mounting tabs of optical element 100. As can be understood, if threaded insert 204A tends to move upward and pull out of mounting tab 204 due to the threading of screw 304 into threaded insert 204A, mounting support structure 400 will prevent threaded insert 204A from engaging mounting tab 104 of optical element 100. Thus, any upward force applied by threaded insert 204A will be applied to mounting support structure 400 and, since mounting support structure 400 is comprised of a rigid structure, it will not deform. Consequently, no force will be applied to mounting tab 104 of optical element 100. In order for mounting support structure 400 to prevent threaded insert 204A from engaging mounting tab 104 of optical element 100, the diameter of the aperture defined by mounting support structure 400 is less than the diameter of the aperture defined by mounting tab 204. Thus, threaded insert 204A will not be able to move up and through the aperture that is defined by mounting support structure 400.

Whereas only the mounting arrangement between mounting tab 104, mounting support structure 400, and mounting tab 204 of mounting plate 200 is illustrated in FIG. 9, the same physical relationship between the other mounting tabs of optical element 100, mounting support structure 400 and the other mounting tabs of mounting plate 200 exist and a detailed description of their arrangement is not required for an understanding of the invention. Thus, as can be understood, the present invention provides a single structural component that is able to support multiple mounting points between an optical element and a mounting plate. With the present invention, it can be understood that if a particular threaded insert pulls out of its mounting tab, mounting support structure 400 would not allow the loosened threaded insert to damage the mounting tab of the optical element. The provision of a single structural component to support multiple mounting points is desirable over an alternative of providing a separate support structure for each mounting point. The use of separate, multiple structural supports is less desirable because of issues related to positioning each of the supports at the mounting joints and the strength of the individual support structures since they would not be able to benefit from the increased inherent strength that results from a larger, unitary structural component. However, the principles of the present invention could be practiced by providing a separate support structure for each mounting point.

Figure 10:
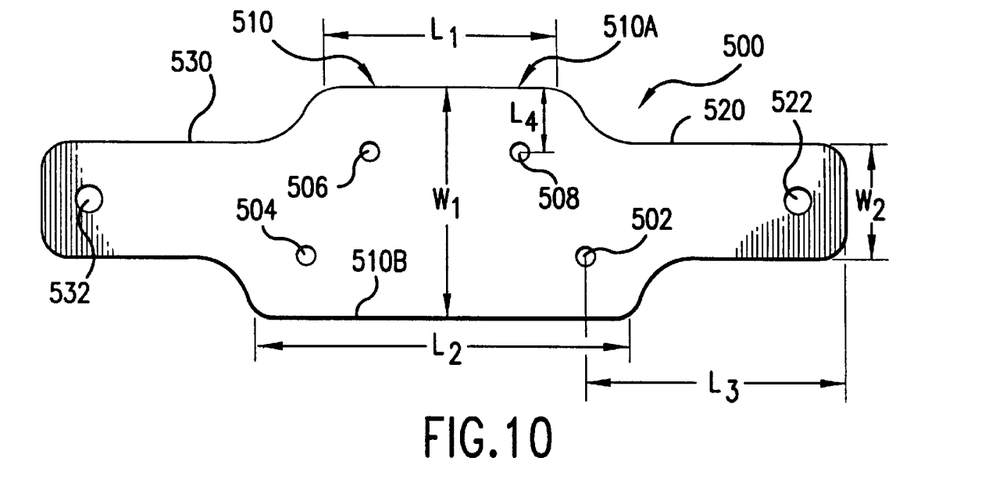
FIG. 10 is a top view of a second embodiment of a mounting support structure in accordance with the present invention.

FIG. 10 illustrates a second embodiment for a mounting support structure in accordance with the principles of the present invention. Mounting support structure 500, as illustrated in FIG. 10, would be utilized in the same manner as was described for mounting support structure 400 of FIGS. 6 through 9. However, the physical configuration of mounting support structure 500 has been modified such that it is formed to be accommodated in a different application. For example, mounting support structure 500 could have an optical element mounted to it that is a 3-dB coupler, as opposed to the wave division multiplexer that was mounted to mounting support structure 400 as described previously. Whereas the mounting apertures associated with the 3-dB coupler would be positioned as were those of the wave division multiplexer, the 3-dB coupler would be received within a different assembly such that a different configuration is required for mounting support structure 500. Mounting support structure 500 has particular utility when mounting a 3-dB coupler within an optical pump unit. Therefore, whereas the mounting apertures of the optical element to be mounted on mounting support structure 500 are positioned as were the mounting apertures that were included in optical element 100 and whereas the apertures defined within mounting support structure 500 are also positioned as were the apertures defined by mounting support structure 400, the structural configuration of mounting support structure 500 has been modified in order so that it can be accommodated into a different assembly.

In further describing the mounting support structure 500 as illustrated in FIG. 10, it can be seen that mounting support structure 500 includes a body portion 510 and first and second arm portions 520, 530, respectively. Body portion 510 has a width $W_1$ of approximately 0.78 inches and includes a first side 510A of a length $L_1$ and a second side 510B of a second length $L_2$ where length $L_1$ is less than length $L_2$. The lengths for first side 510A and second side 510B are not rigidly defined, however, as can be seen in FIG. 10, each side gradually tapers to form the arm portions. Each arm portion 520, 530 has a width $W_2$ of approximately 0.284 inches. First arm portion 520 defines a mounting aperture 522 and second arm portion 530 defines a mounting aperture 532, both of which can be utilized to mount mounting support structure 500 within an optical assembly.

As was described above, the body portion 510 of mounting support structure 500 defines four apertures within it, namely apertures 502, 504, 506, and 508. These four apertures are positioned relative to each other as was described previously for the four apertures that were defined in mounting support structure 400. Aperture 502 is located approximately a distance $L_3$ of 0.7 inches from the outer end of first arm portion 520 and aperture 504 is positioned similarly with respect to second arm portion 530. Additionally, the longitudinal axis of apertures 506 and 508 is positioned a distance $L_4$ of 0.115 inches from the outer end of first side 510A and the longitudinal axis of apertures 502 and 504 is positioned a similar distance from the outer end of second side 510B. Mounting support structure 500 has a thickness of approximately 0.02 inches.

Figure 11:
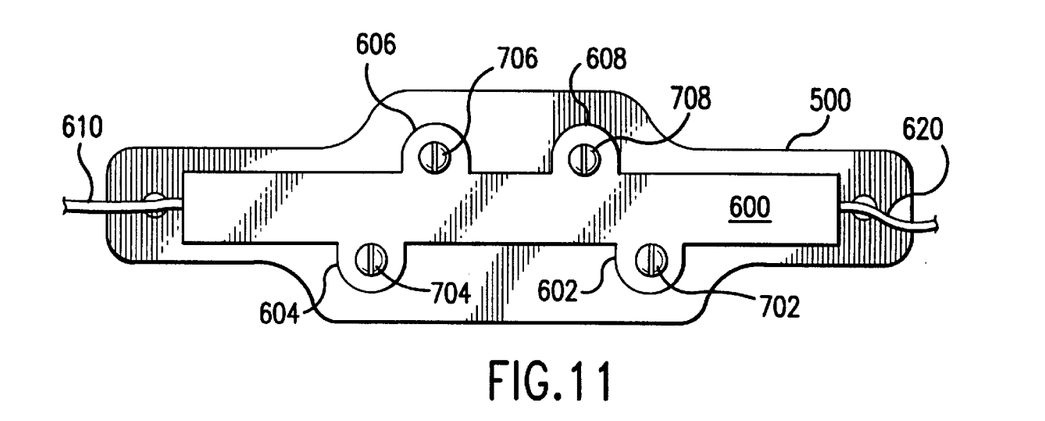
FIG. 11 is a top view of a mounting arrangement for an optical element and mounting plate utilizing the second embodiment of the mounting support structure of FIG. 10.
Figure 12:
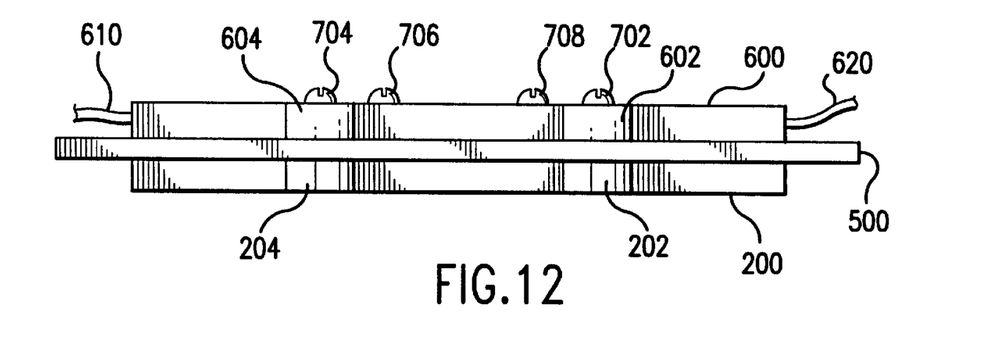
FIG. 12 is a side view of the mounting arrangement of FIG. 11.

As can be seen in FIGS. 11 and 12, and as was described above, an optical element, or coupler, 600 is positioned on mounting support structure 500 and is mounted to mounting plate 200. As such, mounting support structure 500 is positioned between optical coupler 600 and mounting plate 200. Mounting hardware 702 is inserted through mounting tabs 602 and 202, hardware 704 is inserted through mounting tabs 604 and 204, hardware 706 is inserted through mounting tabs 606 and 206 (tab 206 not visible in FIGS. 11 and 12), and mounting hardware 708 is inserted through mounting tabs 608 and 208 (tab 208 also not visible in FIGS. 11 and 12). Thus, the mounting arrangements between the mounting tabs of optical coupler 600, mounting support structure 500, and the mounting tabs of mounting plate 200 are similar to those as illustrated in FIG. 9 for the previous embodiment. Therefore, the threaded inserts that are included in the mounting tabs of mounting plate 200 are prevented from applying an upward force on the mounting tabs of optical coupler 600 by mounting support structure 500.

Figure 13:
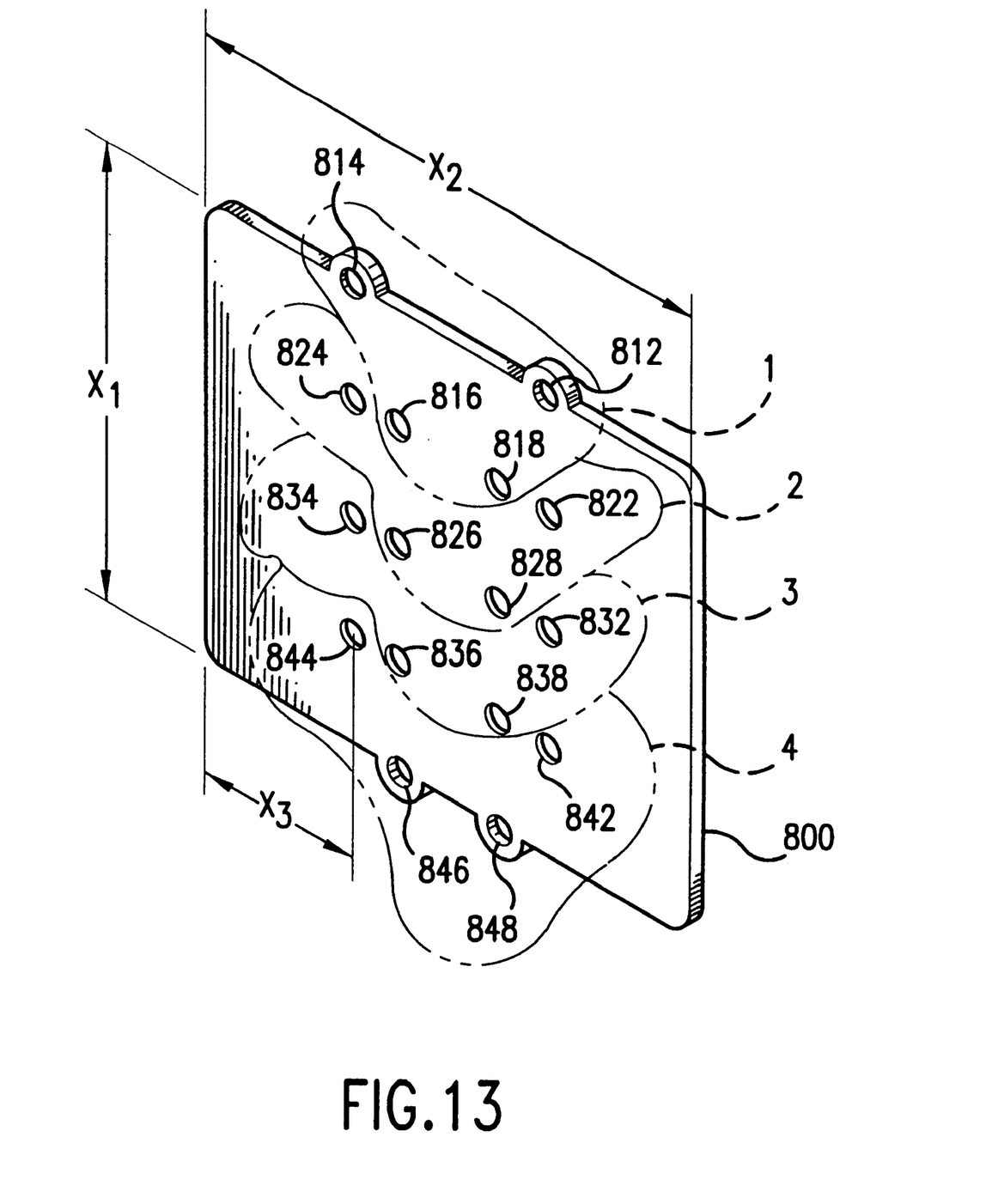
FIG. 13 is a perspective view of a third embodiment of a mounting support structure in accordance with the present invention.

FIG. 13 illustrates a third embodiment for a mounting support structure 800 in accordance with the principles of the present invention. Whereas the previous embodiments for a mounting support structure were disclosed in the context of mounting a single optical element onto a mounting plate, the mounting support structure 800 of FIG. 13 can be utilized to support multiple optical elements. Specifically, as will be described, mounting support structure 800 can be utilized to support four optical elements on a mounting plate. This particular embodiment for mounting support structure 800 would have applicability in an application such as where four optical couplers are mounted in a loop-back coupler module in an optical repeater. Again, the four optical elements would be positioned on mounting support structure 800 and connection hardware would be inserted through the aligned apertures of the optical elements, the mounting support structure, and the mounting plate.

In further describing mounting support structure 800, it can be seen that four sets of mounting apertures are included on mounting support structure 800. Each set of the four mounting apertures would align with the four mounting apertures that are included on each optical element and the four apertures that are included on the mounting plate. The positioning of each mounting aperture with respect to each other mounting aperture in each set of four mounting apertures is as was described for the positioning of the apertures for mounting support structure 400 and mounting support structure 500. Thus, the first set of four mounting apertures that would align with four apertures of an optical element are apertures 812, 814, 816, and 818. This set of four mounting apertures has been grouped as set 1 by the phantom line shown in FIG. 13. Again, this set of four mounting apertures would be positioned relative to each other as was described for the mounting apertures of mounting support structures 400 and 500. The second set of four mounting apertures on mounting support structure 800 that would align with a second optical element to be mounted on the mounting plate are apertures 822, 824, 826, and 828. This second set has been grouped as set 2 by the phantom lines. The third set of four mounting apertures that would align with a third optical element, grouped as set 3, are apertures 832, 834, 836, and 838. Group 4 of the four mounting apertures that would align with a fourth optical element are apertures 842, 844, 846, and 848.

Mounting support structure 800 is a rectangularly-shaped structure that has a length $X_1$ of approximately 2.273 inches±0.01 inches and a width $X_2$ of approximately 2.75 inches±0.01 inches. The axis which aligns apertures 814, 824, 834, and 844 is located approximately a distance $X_3$ of 0.816 inches from an end of mounting support structure 800. Similarly, the axis of apertures 812, 822, 832, and 842 is located approximately 0.816 inches from the other end of mounting support structure 800. Whereas mounting support structure 800 has been described as including four sets of mounting apertures for supporting four optical elements, the present invention is not limited to only supporting this number of optical elements. By utilizing the principles of the present invention, any number of optical elements can be supported on a mounting plate.

Figure 14:
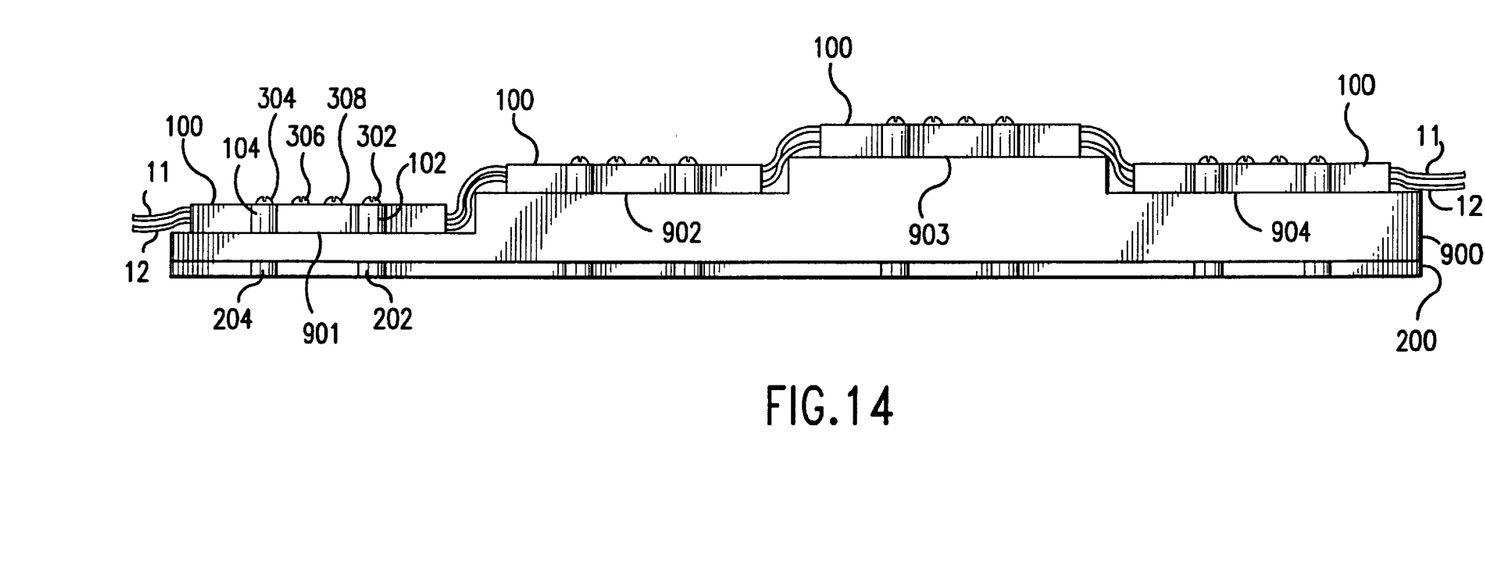
FIG. 14 is a side view of a fourth embodiment of a mounting support structure in accordance with the present invention.

FIG. 14 illustrates a fourth embodiment for a mounting support structure 900 in accordance with the principles of the present invention. The embodiment of FIG. 14 is similar to the embodiment of FIG. 13 in that mounting support structure 900 is capable of supporting multiple optical elements. However, mounting support structure 900 defines a plurality of stepped mounting surfaces where at least some of the mounting surfaces that are used to mount the optical elements differ in height above the mounting plate 200. This embodiment for mounting support structure 900 would have particular utility in an application where the optical elements that are mounted on the mounting support structure are most advantageously positioned at different heights with respect to each other. This could be useful, for example, in preventing physical interference between one element and an adjacent element, for providing for ease of access to the individual elements for a technician, or for preventing optical fibers that connect the optical elements from interleaving. Again, the plurality of optical elements would be positioned on mounting support structure 900 and connection hardware would be inserted through the aligned apertures of the optical elements, the mounting support structure, and the mounting plate.

As can be seen in FIG. 14, 4 optical elements 100 are mounted on mounting plate 200 by placing mounting support structure 900 between the optical elements and the mounting plate. The purpose of mounting support structure 900 is as previously described for the other disclosed embodiments. As can be seen, mounting support structure 900 includes a plurality of mounting surfaces 901, 902, 903, and 904, some of which differ in height above mounting plate 200 and which are thus on different horizontal planes. Therefore, the optical elements 100 may be mounted in a different horizontal plane with respect to each other such that optical fibers 11 and 12, which connect to each optical element 100, are disposed at different locations along their length on different horizontal planes, the potential benefits of which may be as described above.

Since each optical element is similarly mounted on mounting support structure 900, a description for only one of the optical elements is provided. As can be seen, the optical element 100 that is mounted on mounting surface 901 includes mounting tabs 102 and 104, which are visible in FIG. 14, and tabs 106 and 108 which are not visible in FIG. 14. Likewise, mounting plate 200 includes mounting tabs 202, 204, 206, and 208. Each mounting surface 901–904 defines within it a plurality of apertures that align with the mounting apertures included in optical elements 100 and mounting plate 200 when the optical elements are positioned on the mounting plate. Thus, when mounting support structure 900 is positioned between optical element 100 and mounting plate 200, the apertures in mounting surface 901 align with the apertures defined in optical element 100 and mounting plate 200. Connection hardware 302, 304, 306, and 308 is inserted through the aligned apertures to connect optical element 100 to mounting plate 200 through mounting support structure 900, and thus mounting surface 901.

Each of the different embodiments for the mounting support structure disclosed in this specification can be manufactured from a rigid material such as stainless steel CRES 302, 303, or 304, aluminum, or copper, to provide some examples of suitable materials. The mounting support structure must be formed of a material that is sufficiently strong to be able to withstand any forces applied to it by the threaded inserts which are included in the mounting tabs of the mounting plate. Whereas the optical elements, the mounting support structures, and the mounting plates have been described with particular physical configurations, the present invention is not limited to being practiced with any particular configuration for those components. The only requirement is that the apertures included in the mounting support structure align with those provided in the optical element(s) and the mounting plate.

Whereas the present invention has been described as having particular utility in an application where a mounting tab has been formed with an inner tapered surface, the present invention is not limited to use in only this context. The present invention has utility in any mounting application where it is possible that a threaded insert could be pulled out of its mounting structure and thus possibly damage a casing that houses an optical element. For example, even if the casing for the optical element was not formed with a mounting tab with an inner tapered surface, if the casing, and consequently the mounting tab, was formed of a relatively soft or deformable material, the casing could be damaged by a force applied by a pulled-out threaded insert. In fiber optic applications, it is likely that the casing would be formed of such a pliable material since these materials tend to be less abrasive and are less likely to damage the optical element and/or the optical fiber connected to the optical element. Hard metals are likely to contain burrs on their edges which are likely to damage the optical elements/fibers. Therefore, use of a pliable material for forming the casing is desirable in a fiber optic application and the present invention has utility in this particular application.

Similarly, if any gap exists between the casing and the mounting plate, a pulled-out threaded insert may be more likely to damage the casing, regardless of how the mounting tab in the casing is formed, i.e., with either an inner tapered surface and/or formed of a pliable material. This may result from the insert gaining momentum as it detaches from the mounting plate and before it impacts the casing. If there was no gap between the casing and the threaded insert, the insert would contact the casing before it was completely detached from the mounting plate which could possibly help to prevent the insert from damaging the casing. But if a gap was present between the mounting plate and the casing, the insert could apply a greater force to the casing as a result of its unrestrained travel through the gap before it impacts the casing. Therefore, the present invention has utility in this mounting configuration between an mounting plate and a casing as well.

The disclosed embodiments are illustrative of the various ways in which the present invention may be practiced. Other embodiments can be implemented by those skilled in the art without departing from the spirit and scope of the present invention.

What is claimed is:

1. An apparatus for supporting an optical element on a mounting plate, the optical element including a plurality of first mounting tabs, each of said plurality of first mounting tabs defining an optical element aperture therethrough, and the mounting plate including a plurality of second mounting tabs, each of said plurality of second mounting tabs defining a mounting aperture therethrough, the optical element apertures aligning with the mounting apertures when the optical element is positioned with respect to the mounting plate, comprising:

a mounting support structure, said mounting support structure defining a plurality of support structure apertures therein, said mounting support structure positioned between the optical element and the mounting plate, said support structure apertures aligning with the optical element apertures and the mounting apertures such that said optical element is fixedly attached to said mounting plate via said support structure.

2. The apparatus of claim 1 wherein said mounting support structure is rectangularly shaped.

3. The apparatus of claim 1 wherein said mounting support structure includes a body portion having a first width and first and second arm portions, said first and second arm portions formed at opposite ends of said body portion and said first and second arm portions having a second width, said second width less than said first width.

4. The apparatus of claim 1 wherein said mounting support structure is formed of steel.

5. The apparatus of claim 1 wherein a first aperture and a second aperture of said plurality of support structure apertures are positioned a first distance apart and a third aperture and a fourth aperture of said plurality of support structure apertures are positioned a second distance apart, said first distance less than said second distance.

6. The apparatus of claim 3 wherein a first aperture and a second aperture of said plurality of support structure apertures are positioned a first distance apart and a third aperture and a fourth aperture of said plurality of support structure apertures are positioned a second distance apart, said first distance less than said second distance.

7. The apparatus of claim 6 wherein said first aperture, said second aperture, said third aperture, and said fourth aperture are included in said body portion.

8. The apparatus of claim 3 wherein said body portion includes a first side having a first length and a second side having a second length, said first length less than said second length.

9. An apparatus for supporting first and second optical elements on a mounting plate, the first optical element including a first mounting tab defining a first optical element aperture and the second optical element including a second mounting tab defining a second optical element aperture, and the mounting plate including third and fourth mounting tabs, the third mounting tab defining a first mounting aperture therethrough and the fourth mounting tab defining a second mounting aperture therethrough, the first and second optical element apertures aligning with the first and second mounting apertures when the first and second optical elements are positioned with respect to the mounting plate, comprising:

a mounting support structure, said mounting support structure defining a first mounting surface having a first support structure aperture and a second mounting surface having a second support structure aperture, said mounting support structure positioned between the first and second optical elements and the mounting plate, said first and second support structure apertures aligning with the first and second optical element apertures and the first and second mounting apertures.

10. The apparatus of claim 9 wherein said mounting support structure is rectangularly shaped.

11. The apparatus of claim 9 wherein said mounting support structure is formed of steel.

12. The apparatus of claim 9 wherein said first mounting surface is disposed on said mounting support structure at a first horizontal plane and said second mounting surface is disposed on said mounting support structure at a second horizontal plane, said first horizontal plane lower than said second horizontal plane as measured with respect to the mounting plate.

13. An optical assembly comprising:

an optical element, said optical element including a first mounting tab and a second mounting tab, said first and second mounting tabs defining a first optical element aperture and a second optical element aperture, respectively;

a mounting plate, said mounting plate defining a first mounting plate aperture and a second mounting plate aperture;

a mounting support structure, said mounting support structure defining a first support structure aperture and a second support structure aperture;

said mounting support structure positioned between said optical element and said mounting plate, said first optical element aperture aligning with said first support structure aperture and said first mounting plate aperture, and said second optical element aperture aligning with said second support structure aperture and said second mounting plate aperture such that said optical element is fixedly attached to said mounting plate via said support structure;

a first connection member received within said first optical element aperture, said first support structure aperture, and said first mounting plate aperture; and a second connection member received within said second optical element aperture; said second support structure aperture, and said second mounting plate aperture.

14. The optical assembly of claim 13 wherein said optical element is a wave division multiplexer.

15. The optical assembly of claim 13 wherein said optical element is a coupler.

16. The optical assembly of claim 13 wherein said first and second mounting tabs are internally tapered.

17. The optical assembly of claim 13 wherein said mounting support structure is rectangularly shaped.

18. The optical assembly of claim 13 wherein said mounting support structure includes a body portion having a first width and first and second arm portions, said first and second arm portions formed at opposite ends of said body portion and said first and second arm portions having a second width, said second width less than said first width.

19. The optical assembly claim of 13 wherein a first threaded insert is positioned within said first mounting plate aperture and a second threaded insert is positioned within said second mounting plate aperture.

20. A method for mounting an optical element comprising the steps of:

positioning the optical element onto a mounting support structure;

positioning the mounting support structure onto a mounting plate;

aligning a plurality of apertures defined by the optical element with a plurality of apertures defined by the mounting support structure and a plurality of apertures defined by the mounting plate such that the optical element is fixedly attached to the mounting plate via the support structure; and inserting connection hardware into at least two of the aligned plurality of apertures.

21. The method of claim 20 wherein said optical element is a wave division multiplexer.

22. The method of claim 20 wherein said optical element is a coupler.

23. The method of claim 20 wherein said mounting support structure is rectangularly shaped.

24. The method of claim 20 wherein a threaded insert is positioned within each of said plurality of apertures defined by the mounting plate.

* * * * *